March 5, 1968 L. V. PREDDY, JR 3,371,941
AXLE ASSEMBLY FOR DUMP TRUCKS
Filed June 13, 1966 4 Sheets-Sheet 1

INVENTOR
L. V. Preddy, Jr.

BY

ATTORNEY

March 5, 1968  L. V. PREDDY, JR  3,371,941
AXLE ASSEMBLY FOR DUMP TRUCKS
Filed June 13, 1966  4 Sheets-Sheet 2

INVENTOR
L. V. Preddy, Jr.

BY

ATTORNEY

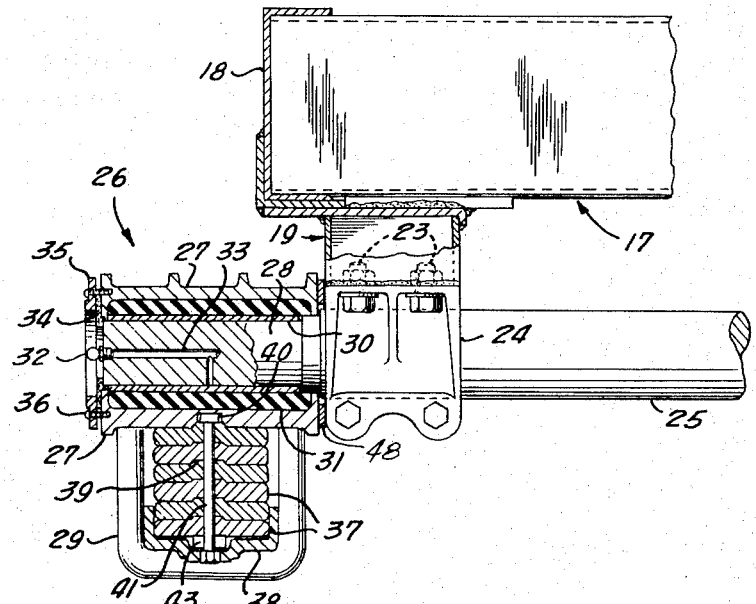
Fig. 4
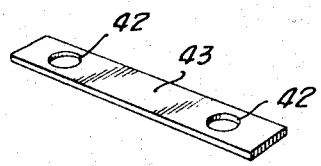
Fig. 5
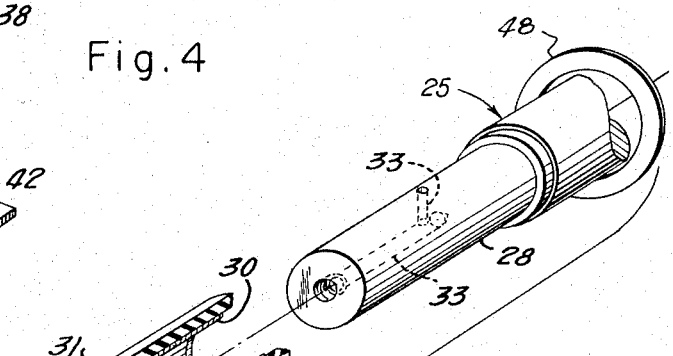
Fig. 6
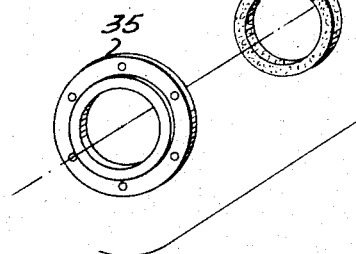

March 5, 1968 L. V. PREDDY, JR 3,371,941
AXLE ASSEMBLY FOR DUMP TRUCKS
Filed June 13, 1966 4 Sheets-Sheet 4

INVENTOR
L. V. Preddy, Jr.
BY Cecil L. Wood
ATTORNEY

United States Patent Office 3,371,941
Patented Mar. 5, 1968

3,371,941
AXLE ASSEMBLY FOR DUMP TRUCKS
L. V. Preddy, Jr., Dallas, Tex., assignor to Dye Trucking Company, Dallas, Tex., a corporation of Texas
Filed June 13, 1966, Ser. No. 557,232
8 Claims. (Cl. 280—104.5)

This invention relates to a dual axle wheel unit, and it has particular reference to certain specific improvements as incorporated in a dual axle wheel unit as hereinafter described which is peculiarly adapted for use in a large trailer vehicle having a dump body in which the load is dumped by raising the front end of the body, for example.

In dual axle wheel units for trucks, trailers, and the like, the bolster has heretofore been mounted upon the axles by a pivotal rocker arrangement upon a trunnion about which the axle mounting is permitted to rock in accordance with the up and down movements of one set of wheels with respect to the other. The pivotal arrangements above mentioned are intended to be kept well lubricated.

Patent No. 2,481,891, dated Sept. 13, 1949, issued to Harvey B. Van Raden shows an improved and now conventional arrangement in which there is no lubrication between the trunnion shaft and the housing parts whereby the shaft is secured at its ends to the axle mounting. Instead the cylindrical cushion members shown, which are of resilient, deformable material such as rubber, and are of larger diameter than the inside diameter of the housings, and which surround the ends of the shaft are disposed between the shaft and said housings. A plurality of grooves or ridges are provided in the adjacent surfaces of the shaft and the housing parts for the purpose of preventing slippage between the surfaces of the shaft and the housings and the adjacent surfaces of the cylindrical cushion members.

The arrangement shown in the above mentioned patent is not well adapted for use with a large vehicle having a dump body in which the load is dumped by raising the front end of the body, and in which there is substantial pivotal movement of the body with a trunnion shaft about a transverse axis, as in tilting the body to a dumping position and thereafter lowering it, so that in practice the cylindrical cushions are subject to excessive wear and their useful life is comparatively short.

The position of the trunnion shaft below the spring units in conventional design results in abutment of the under side of the body against the spring units, rearwardly thereof, substantially at the beginning of such pivotal movement about a transverse axis, as in tilting the body to a dump position, so that the front wheels of the dual axle wheel unit are raised above the ground, leaving the vehicle supported on the back wheels only, with the front end of the body raised high in the air, in which position the vehicle may be easily upset, particularly on uneven ground.

A prime object of the invention is that of providing a dual axle wheel unit, peculiarly adapted for use in a large trailer vehicle having a dump body in which the load is dumped by raising the front end of the body, for example, having incorporated therein certain advantageous features as shown in the patent while at the same time avoiding the disadvantageous features above mentioned.

In one form thereof, the invention resides in the provision of a dual axle wheel unit as described having cylindrical cushions corresponding to the cushions shown in the patent, and having bearing means on an axle mounting supporting said cushions on a trunnion shaft for free rotative adjustment relative thereto.

In another form of the invention the trunnion shaft may be yieldably connected to the axle mounting, for limited rotative adjustment relative thereto, but the body of the vehicle is yieldably connected to the trunnion shaft by an arrangement which includes cylindrical cushions corresponding to the cushions such as those shown in the patent, and having bearing means on the body supporting said cushions on the trunnion shaft for free rotative adjustment relative thereto.

The invention further contemplates in one form thereof, the provision of a dual axle wheel unit as described having a pair of sleeves, each surrounding one end of a trunnion shaft positioned between the shaft and a pair of cylindrical cushions and having lubricating fittings and channels in the adjacent end portions of said shaft communicating with said sleeves for pressure lubrication of said sleeves and the opposing surfaces of said shaft.

The invention also contemplates certain optional arrangements in which the sleeves which comprise the bearings may be split longitudinally, and in which the material thereof may be self lubricating.

According to the invention the trunnion shaft is positioned above, not below, the leaf spring units of the axle mounting and is connected thereto at its ends, for rotative adjustment about its axis and for limited rotative adjustment about a vertical axis, by said sleeves, said cylindrical cushions, and housing parts as shown.

While the foregoing objects are paramount, other and lesser objects will become apparent as the description proceeds, when considered in connection with the appended drawings wherein:

FIGURE 1 is a side elevational view showing, in combination with an automotive tractor vehicle, the combination of a trailer vehicle having a dual axle wheel unit embodying the invention, and having a dump body in which the load is dumped by raising the front end of the body, showing the body in its tilted position, for unloading, and showing the wheel unit with all of its wheels positioned firmly on the ground.

FIGURE 4 is a fragmentary elevational view, partly in section taken on the line 4—4 of FIGURE 2 and partly broken away.

FIGURE 5 is a perspective view showing in more detail one of the parts shown in FIGURE 4.

FIGURE 6 is a fragmentary exploded perspective view, partly broken away, showing portions of the apparatus as illustrated in FIGURE 4.

Figure 1:
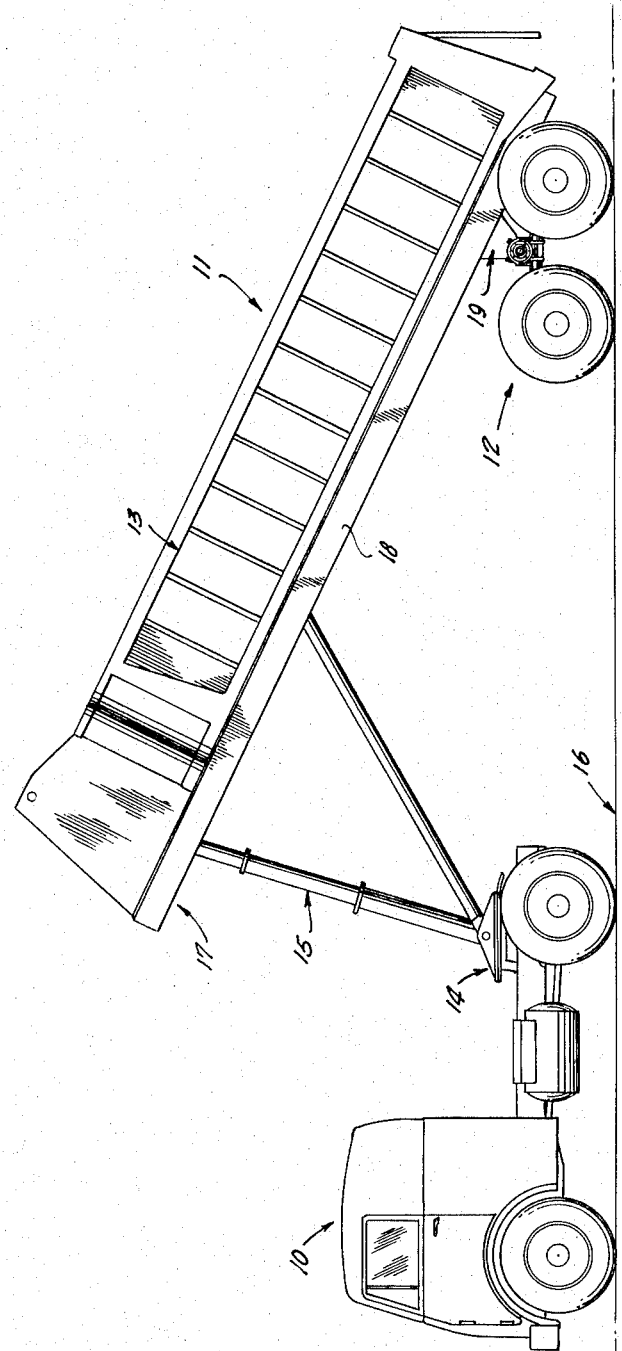

Referring to FIGURE 1 of the drawing, the numeral 10 designates generally and automotive tractor vehicle, specifically, a truck, and the numeral 11 indicates generally a trailer vehicle having a dual axle wheel unit, indicated generally by the numeral 12, and having a dump body, indicated generally by the numeral 13, in which the load is dumped by raising the front end of the body 13. The truck 10 has a rotatable platform 14 rearwardly thereof on which the front end of the body 13 is supported, and has hydraulic lifting means 15 on the platform 14 whereby the front end of the body 13 is raised and lowered. As shown the body 13 is in its tilted position, for unloading, and the wheel unit 12 has all of its wheels positioned firmly on the ground, indicated by the line 16.

Figure 3:
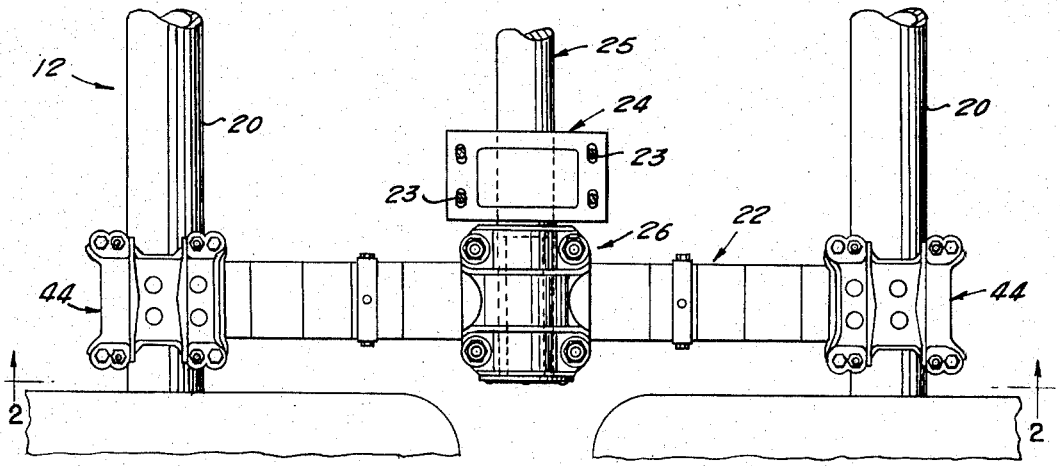
FIGURE 3 is a fragmentary sectional plan view taken on the line 3—3 of FIGURE 2.
Figure 2:
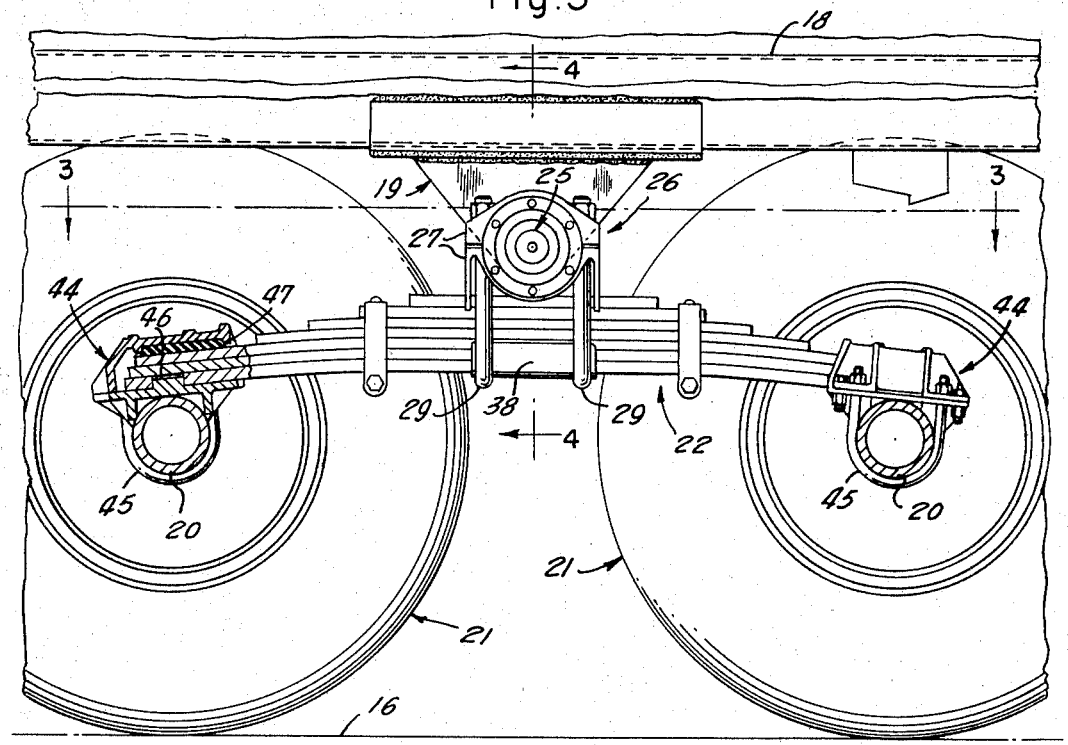
FIGURE 2 is a fragmentary elevational view on an enlarged scale, partly in section taken on the line 2—2 of FIGURE 3 and partly broken away, showing the wheel unit.

The body 13 is mounted on a frame 17 having a pair of longitudinally extending members 18, one of which is shown, and having a pair of depending stools 19, one of which is shown, whereby the frame 17 is connected to the wheel unit 12 for rocking movement about a transverse axis relative thereto, as shown in FIGURES 2 to 4 and as hereinafter more fully described.

Referring now to FIGURES 2 to 4, the wheel unit 12 includes a pair of axles 20 which are arranged in tandem relation to each other, and each of which has at least one pair of wheels 21, two wheels 21 of which are shown. As shown best in FIGURE 2, the axles 20 of said pair are connected by a pair of leaf spring units 22, the ends of which extend across the top sides of the axles 21 and are clamped thereto as hereinafter described. The stools 19 which support the frame 17 are secured by bolts 23 to individual platforms 24 which in turn are clamped to intermediate portions of a trunnion shaft 25, which extends transversely of the frame 17 and has its ends journaled in bearings therefor, indicated generally by the numeral 26, which are clamped to the top sides of the spring units 22 intermediate their ends.

As shown best in FIGURES 4 and 6, the bearings 26 each include a pair of semi-cylindrical clamping members 27 which loosely encircle a reduced end portion 28 of the trunnion shaft 25 and are clamped together, and to the corresponding spring unit 22, by a pair of U bolts 29.

A metal sleeve 30, which immediately surrounds the reduced end portion 28 of the shaft 25 and has an inside diameter corresponding substantially to the diameter of said end portion 28, provides a bearing for rotative adjustment of the shaft 25 relative thereto.

A yieldable cylindrical element 31, which is formed of resilient material such as rubber, and which immediately surrounds the sleeve 30, is positioned between the sleeve 30 and the clamping members 27. The cylindrical element 31, which has an outside diameter greater than the inside diameter of the clamping members 27, frictionally engages the sleeve 30 and the clamping members 27, and permits limited rotative adjustment of the shaft 25 and the sleeve 30 about a vertical axis relative to the clamping members 27, as in turning corners.

The reduced end portion 28 of the shaft 25 has a lubricating fitting 32 and channels 33 therein communicating with the inside of the sleeve 30, for pressure lubrication of the sleeve 30 and the opposing surfaces of said one end portion 28.

The sleeve 30 is secured against longitudinal displacement relative to the clamping members 27 by an annular sealing ring 34, which slidably engages the outer end of the sleeve 30 and is secured in place by an annular retaining element 35 which is connected to the outer ends of the clamping members 27 by screws 36.

As shown in FIGURES 4 and 5, the individual leaves 37 of the respective spring units 22 are clamped between the under side of the lowermost clamping member 27 and a channel shaped supporting element 38 which embraces the lowermost leaves 37 and has the U belts 29 passed immediately below it.

Each of the leaves 37 has a raised portion on its top side for engagement by a corresponding depression in the under side of an adjacent leaf 37, as at 39, and a corresponding depression is formed in the under side of the lowermost clamping member 27 for engagement by the raised portion on the top side of the uppermost leaf 37, as at 40.

The leaves 37 are additionally clamped together, independently of the U bolts 29, by a pair of bolts 41, which are passed through openings therefor in the leaves 37 and through openings 42 in opposite ends of an elongated planar element 43, shown in FIGURE 5, which extends longitudinally of the leaves 37 and is positioned immediately below the lowermost leaf 37, above the supporting element 38.

As shown in FIGURE 2, the opposite end portions of the spring units 22 are each received in a two piece box shaped enclosure 44 having an open end, and which is clamped to the top side of the corresponding axle 20 by a pair of U bolts 45.

An upstanding boss 46 on the bottom of the enclosure 44 is engageable with a corresponding opening in the lowermost leaf 37 whereby longitudinal displacement of said leaf relative to the enclosure 44 is prevented while at the same time permitting longitudinal adjustment of the leaves 37 relative to each other in response to normal movement thereof.

A resilient pad 47 is disposed between the top of the enclosure 44 and the opposing surface of the adjacent leaf 37.

As shown in FIGURES 4 and 6, a pair of thrust bearings 48, which surround the trunnion shaft 25, are positioned between the platforms 24 which, with the stools 19, support the frame 17, and the adjacent bearings 26.

Figure 7:
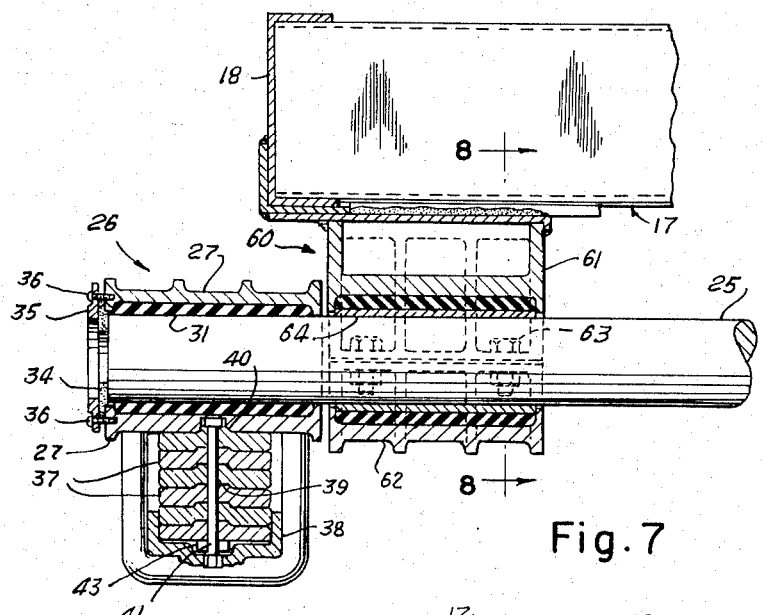
FIGURE 7 is a view similar to FIGURE 4 showing a modified form of the invention.
Figure 8:
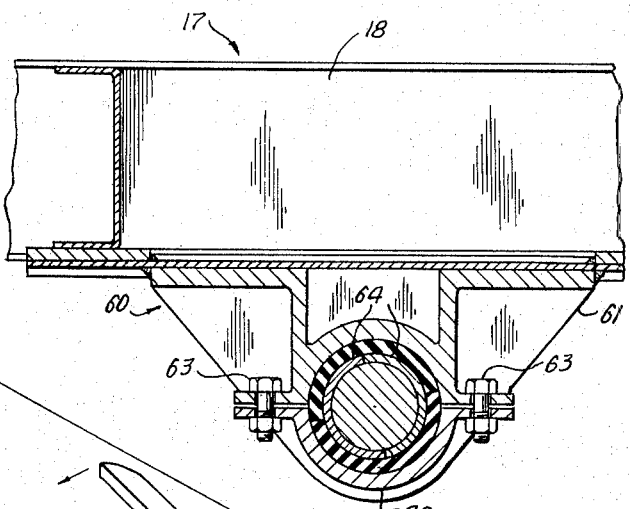
FIGURE 8 is a sectional view taken on the line 8—8 of FIGURE 7.
Figure 9:
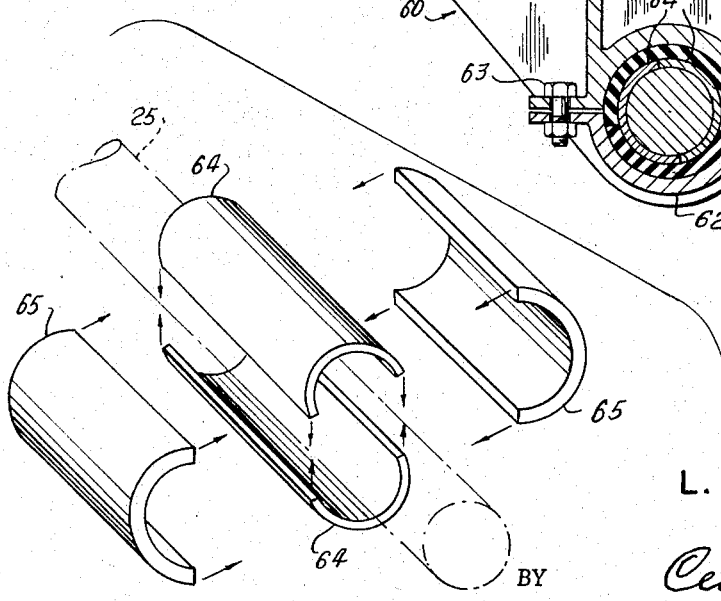
FIGURE 9 is a fragmentary exploded perspective view showing portions of the apparatus as illustrated in FIGURE 7.

In the modified form of the invention shown in FIGURES 7 to 9 the opposite end portions of the trunnion shaft 25 are not reduced, as at 28 in FIGURE 4, and the trunnion shaft 25 is yieldably connected to the axle mounting, for limited rotative adjustment relative thereto, by an arrangement similar to that described in the above mentioned patent, which does not include the metal sleeve 30 and the means for lubricating it.

As shown in FIGURES 7 to 9 the frame 17 is supported on a pair of stools 60, one of which is shown, which correspond to the stools 19 and the platforms 24 shown in FIGURE 4. The stools 60 each include a pair of semi-cylindrical portions 61 and 62 which are separable and which loosely encircle an intermediate portion of the trunnion shaft 25 and are clamped together by bolts 63. A metal sleeve 64, which corresponds to the metal sleeve 30 shown in FIGURE 4, and which immediately surrounds the trunnion shaft 25, provides a bearing for rotative adjustment of the shaft 25 relative thereto. As shown, the sleeve 64 is split longitudinally and the material thereof is self lubricating. A yieldable cylindrical element 65, which corresponds to the cylindrical element 31 shown in FIGURE 4, and which is split longitudinally, immediately surrounds the sleeve 64 and is positioned between the sleeve 64 and the semicylindrical portions 61 and 62.

The invention may be modified within certain limitations, by persons skilled in the art, without departing from the spirit and intent thereof or the scope of the appended claims.

What is claimed is:

1. In a vehicle having a body and having a dual axle wheel unit, the combination of a wheel unit including a pair of axles arranged in tandem relation to each other, a pair of leaf spring units extending across the top sides of said axles and having their opposite ends connected thereto, respectively, and a trunnion shaft supporting said body for rocking movement about a transverse axis and having its opposite end portions journaled in bearings therefor clamped to the top sides of said spring units intermediate their ends, said bearings each including a pair of semi-cylindrical clamping members loosely encircling the adjacent end of the trunnion shaft and having means clamping them together, and to the corresponding spring unit, a metal sleeve immediately surrounding said end portion of the shaft and providing a bearing for rotative adjustment of the shaft relative thereto, and a yieldable cylindrical element, formed of molded resilient material, immediately surrounding the sleeve and positioned between the sleeve and said clamping members said cylindrical element having an outside diameter greater than the inside diameter of the clamping members and frictionally engaging said sleeve and said clamping members and means in said end portions of said trunnion shaft communicating with the inside of said sleeves for lubricating said sleeves and the opposing surfaces of said shaft.

2. In a vehicle having a body and having a dual axle wheel unit including a pair of axles arranged in tandem relation to each other, a pair of leaf spring units extending across said axles and having their opposite ends connected thereto, respectively, a trunnion shaft arranged transversely of said body and below it, and a pair of depending stools on said body for engagement with said trunnion shaft, the improvement which comprises connecting means connecting opposite end portions of said trunnion shaft to said spring units intermediate their ends and other connecting means connecting said stools to said trunnion shaft intermediate its ends, at least one of said connecting means comprising two pairs of semi-cylindrical housing members loosely encircling said trunnion shaft and having means clamping them together in radially spaced relation to said shaft, a metal sleeve for the housing members of each pair immediately surrounding said shaft and providing a bearing for rotative adjustment of said shaft relative thereto, and a yieldable cylindrical element, formed of molded resilient material, immediately surrounding said sleeve and positioned between said sleeve and the housing members of one pair, said cylindrical element having an outside diameter greater than the inside diameter of said housing members and frictionally engaging said sleeve and said housing members.

3. The structure of claim 2, the housing members of one pair being connected to each of said spring units intermediate its ends.

4. The structure of claim 2, the housing members of one pair being connected to each of said stools adjacent its lower end.

5. The structure of claim 2, said sleeves being split longitudinally.

6. The structure of claim 2, said cylindrical members being split longitudinally.

7. The structure of claim 2, and means on said trunnion shaft communicating with the inside of said sleeves for lubricating said sleeves and the opposing surfaces of said shafts.

8. The structure of claim 2, the material of said sleeves being self lubricating.

References Cited
UNITED STATES PATENTS

| | | | |
|---|---|---|---|
| 1,771,488 | 7/1930 | Duesler | 280—104.5 |
| 2,810,587 | 10/1957 | Boughner | 280—104.5 |

BENJAMIN HERSH, *Primary Examiner.*

P. GOODMAN, *Assistant Examiner.*